May 7, 1935. T. H. LONG 2,000,705
PHOTOTUBE
Filed Jan. 17, 1931
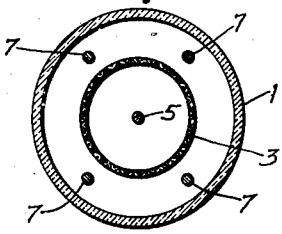
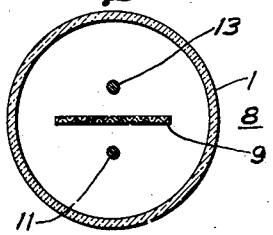
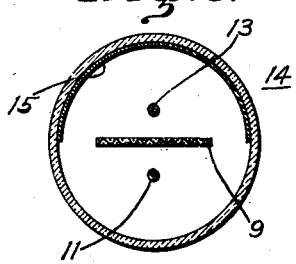
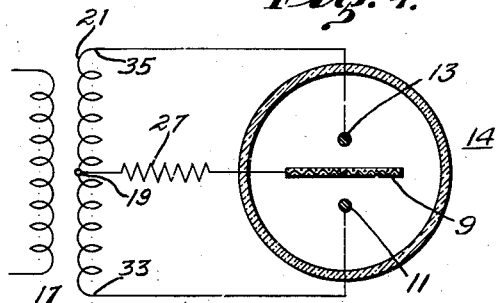
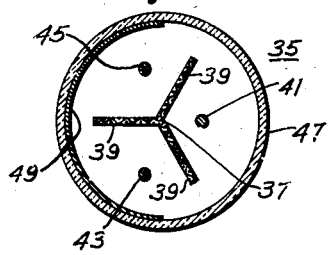
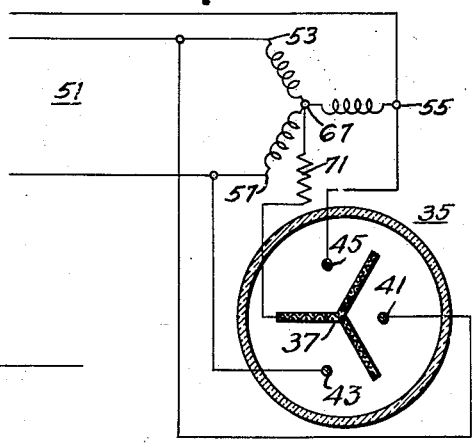
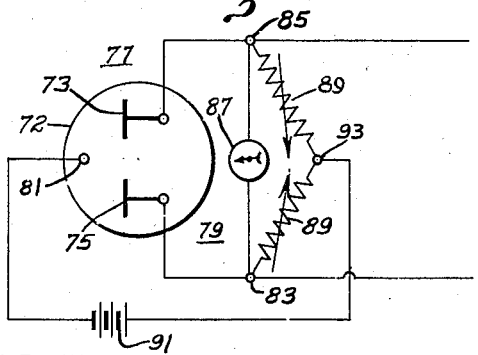
WITNESSES
INVENTOR
Thomas H. Long
BY
ATTORNEY Patented May 7, 1935

2,000,705

UNITED STATES PATENT OFFICE 2,000,705

PHOTOTUBE

Thomas H. Long, Irwin, Pa., assignor to Westinghouse Electric & Manufacturing Company, a corporation of Pennsylvania Application January 17, 1931, Serial No. 509,377

4 Claims. (Cl. 250—27.5)

My invention relates to photo-sensitive devices and has particular relation to photo-sensitive devices of the type adapted to be utilized with single-phase or plural-phase power supply.

Photo-sensitive devices constructed according to the teachings of the prior art, of which I am aware, ordinarily comprise a single cathode and a single anode. When the device is utilized with an alternating power-supply source, it has a response similar to that of a half-wave rectifier, responding only to the positive half-cycles and, consequently, supplies the energy in discontinuous pulsations.

In many applications of a photo tube, such as the cinema-acoustic art, it is highly desirable that the photo tube respond continuously when subjected to the influence of an alternating power-supply source and to a source of light. As a matter of fact, a difficult problem has arisen in connection with the operation of cinema-acoustic machines in localities wherein a direct-current power supply was not available by reason of the fact that the alternating-current power-supply causes a rather disagreeable hum to be superimposed upon the sound transmitted.

Moreover, by reason of the fact that the ordinary tube is conductive only during the time that half-cycles of an alternating-current power-supply source are impressed between its electrodes in proper polarity, its sensitivity, when it is utilized with the alternating-current power-supply source, is considerably smaller than its sensitivity when it is utilized with a direct-current power source.

It is, accordingly, an object of my invention to provide a photo-sensitive device that shall have a uniform response when subjected to the influence of an alternating-current power-supply source.

Another object of my invention is to provide a photo tube adapted to deliver a continuous current when its photo-sensitive elements are subjected to the influence of light, and a potential from an alternating-current power supply source is impressed between its electrodes.

More concisely stated, it is an object of my invention to provide a photo-sensitive device of a type having a plurality of collecting electrodes so related to a photo-sensitive electrode that, when the device is subjected to the influence of a single-phase or a plural-phase potential, at least one collecting electrode is, at all times, adapted to collect the current from the photo-sensitive electrode.

According to my invention, I provide a photo-sensitive device of the type comprising a plurality of independent electrodes.

In the preferred embodiment of my invention, a single cathode is provided, and a plurality of anodes are associated with the cathode. The cathode is connected to the electrical center of the power-supply source, while the anodes are connected to the terminals of the source. As a result, the anodes are maintained at periodic potentials displaced in phase relative to each other of a predetermined angle.

For purposes of explanation, my invention has been illustrated as applied to an ordinary alternating-current single-phase power-supply source and to a three-phase source. In the former instance, a single cathode and two anodes are utilized. In the latter instance, a single cathode and three anodes are utilized.

In the application of my invention to the instruction of a tube specifically useable for single-phase operation, the cathode is in the form of a perforated cylinder, and the anodes are disposed the one within the cylinder and the other outside of it. The tube that is adapted to be utilized with three-phase power is equipped with a perforated cathode having three re-entrant regions wherein the anodes are disposed.

The novel features that I consider characteristic of my invention are set forth with particularity in the appended claims. The invention itself, however, both as to its organization and its method of operation, together with additional objects and changes thereof, will best be understood from the following description of specific embodiments, when read in connection with the accompanying drawing, in which:

Figure 1 is a view, in transverse section, showing a specific embodiment of a photo tube constructed according to my invention and adapted to be utilized with single-phase alternating-current power supply;

Fig. 2 is a view, in transverse section, illustrating a modification of the tube shown in Fig. 1;

Fig. 3 is a view, in transverse section, showing a further modification of the tube illustrated in Fig. 1;

Fig. 4 is a diagrammatic view showing the essential elements of the circuit wherein a tube constructed according to Fig. 2 is utilized.

Fig. 5 is a view, in transverse section, showing a tube constructed according to my invention and particularly adapted to be utilized with a three-phase power-supply source;

Fig. 6 is a diagrammatic view illustrating the essential elements of the circuit where a tube according to Fig. 5 is utilized, and Fig. 7 is a diagrammatic view illustrating a balanced circuit wherein a minor modification of my invention may be utilized.

The apparatus shown in Fig. 1 comprises a container 1 of transparent material wherein are disposed a cylindrical cathode 3 of perforated material and a plurality of anodes 5 and 7. The single anode 5 disposed within the cylindrical cathode 3 is adapted to be connected to one terminal of an alternating-current power-supply source, while the remaining anodes 7 are conductively connected and are adapted to be joined to another terminal of an alternating-current power-supply source.

The specific structure of the tube 1 will be apparent to one skilled in the art of manufacturing tubes and need not be specifically described herein.

In the tube 8 of the type illustrated in Fig. 2, the cylindrical cathode is replaced by a plane cathode 9 that is disposed between a plurality of independent anodes 11 and 13.

The tube 14, of the type illustrated in Fig. 3, has the additional feature of an internal reflecting surface 15 so disposed as to receive the light that is transmitted through the perforations of the cathode 9 and to reflect it back to the cathode. It is to be noted that the tube 14 can receive radiations only from the direction of the unsilvered surface of the container. It is, furthermore, understood that, in general, the tubes are applied in situations wherein only a single source of light is available. A tube of the type illustrated in Fig. 3 has considerably higher sensitivity than tubes which are not provided with reflecting surfaces.

The apparatus illustrated in Fig. 4 comprises a transformer 17, the electrical center 19 of the secondary 21 of which is connected to the cathode 9 of a tube 14 through a load 27 of any type, (such as a mechanical relay or a thermionic amplifier, for example). The anodes 11 and 13 of the tube are connected to the terminals 33 and 35 of the secondary 21.

It is seen that the anodes 11 and 13 of the tube 14 are continually at potentials of opposite polarity; if one is positive relative to the cathode 9, the other is negative. As a result, a pulsating current flows through the load associated with the system. It will be noted that the system simulates a push-pull thermionic amplifier.

The tube 35 of the type illustrated in Fig. 5 is equipped with a cathode 37 comprising a plurality of plane surfaces 39 bounding a plurality of regions wherein the anodes 41, 43 and 45 are disposed. As illustrated in the view, the tube 35 is shown as equipped with a container 47 having a reflecting surface 49 similar to the container of the tube 14.

The apparatus shown in Fig. 6 comprises a three-phase line 51 to the terminals 53, 55 and 57 of which the anodes 41, 43 and 45 of a tube 35 of the type illustrated in Fig. 5, are connected, and to the electrical center 67 of which the cathode 37 of the tube is connected, through a load 71 It will be noted that, as the potentials impressed upon the anodes 59, 61 and 63 vary, each anode, in its turn, collects the current from the cathode 69.

Since the values of positive potential for the anodes 41, 43 and 45 overlap, the current supplied by the cathode 37 will, at times, be the sum of the current supplied to two anodes. By reason of this feature, the output of the system is rendered uniform, since, when one anode is decreasing in potential, the second anode is increasing and becomes positive before the former becomes negative. Hence, the increase in the potential of the latter anode tends to compensate for the decrease in the potential of the former anode.

It is understood that, although my invention has its most useful applications in the specific form described above and illustrated in the drawing in its most general application, it may be regarded as simply embodied in a plural electrode photo tube.

In Fig. 7, a circuit, wherein a tube having a plurality of cathodes and a single anode is utilized is shown. In the form illustrated in this view, my invention is particularly adapted to be utilized in a bridge network, as shown.

It is a well known fact that considerable difficulty is encountered in the use of a balanced network system wherein individual photo tubes are disposed in the arms. This difficulty arises by reason of the fact that the individual photo tubes, being of different structure, have characteristics which vary differently as a function of time and, consequently, when they are connected in a network, the system cannot be maintained in a permanently stable condition.

According to the modification of my invention shown in Fig. 7, a plurality of individual cathodes 73 and 75 are disposed within a single container 72. As a result of this structure, the essential physical conditions to which the cathodes 73 and 75 are continually exposed, are the same. Consequently, when the tube 77 is connected in a bridge network 79 in such manner that the two ionic paths between the cathodes 73 and 75 and the anode 81 constitute two arms thereof, a balanced system is produced that has permanent response and that need not be readjusted at comparatively short intervals of time.

As shown in Fig. 7, the cathodes 73 and 75 are connected to two conjugate terminals 83 and 85 of the bridge 79 between which an indicating instrument 87 is connected. A plurality of variable impedances 89 of requisite type are connected in the remaining arms of the bridge 79, and a power supply source 91, illustrated as a battery, is connected between the junction point 93 of the impedance 89 and the anode 81 of the tube 77.

As has been indicated above, my invention has been shown herein in certain specific embodiments. It has been applied to single-phase and to three-phase systems. It is understood that my invention equally as well applies to plural-phase systems of higher degree than three-phase.

While the principal features of my invention relate to its exercise in connection with tubes of the type having a single cathode and a plurality of anodes, or to tubes of the type having a single anode and a plurality of cathodes, it is equally well applicable to tubes of the type having a plurality of cathodes and a plurality of anodes, where such tubes prove useful.

Finally, it is well to point out that while, in the embodiments of my invention illustrated in Figs. 1 to 6, the cathodes are shown as perforated, there are certain connections wherein more than one source of light is useable and where, as a consequence, solid cathodes may be utilized.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A photo-sensitive device comprising a plurality of collecting electrodes capable of being maintained at independent potentials and a light permeable photo-responsive emitting electrode, said emitting electrode electrically shielding certain of said collecting electrodes from certain others of said collecting electrodes.

2. A photo-sensitive device comprising a cylindrical photo-responsive emitting electrode and at least two collecting electrodes capable of being maintained at independent potentials, one of said collecting electrodes being disposed within said photo-responsive electrode and the other electrode being disposed outside of said photo-responsive electrode, said collecting electrodes being thereby electrically shielded from each other by said photo-responsive electrode.

3. A photo-sensitive device, for use with a periodic power source having a plurality of terminal taps and an intermediate tap, comprising a plurality of collecting electrodes and a light-permeable photo-responsive emitting electrode, said emitting electrode electrically shielding certain of said collecting electrodes from certain others of said collecting electrodes.

4. A polyphase photo-tube comprising an envelope housing a star-shaped photo-sensitive cathode providing a multiplicity of isolated compartments, each of said compartments containing a cooperative anode to be connected to the terminals of a polyphase network.

THOMAS H. LONG.